United States Patent [19]
Moyer

[11] Patent Number: 5,171,521
[45] Date of Patent: Dec. 15, 1992

[54] INTERTUBE THERMAL CONDUCTANCE RATE LIMITING DEVICE

[75] Inventor: Ralph G. Moyer, Pinawa, Canada

[73] Assignee: Atomic Energy of Canada Limited, Ottawa, Canada

[21] Appl. No.: 764,547

[22] Filed: Sep. 24, 1991

[30] Foreign Application Priority Data
Sep. 28, 1990 [CA] Canada ................. 2026467

[51] Int. Cl.5 .............................. G21C 3/06
[52] U.S. Cl. ................................. 376/436
[58] Field of Search ............. 376/431, 433, 436, 291, 376/292; 976/DIG. 74, DIG. 80

[56] References Cited
U.S. PATENT DOCUMENTS

| | | | |
|---|---|---|---|
| 3,280,003 | 10/1966 | Alfille et al. | 376/433 |
| 3,944,468 | 3/1976 | Duret et al. | 376/436 |
| 4,005,521 | 2/1977 | Kaplan et al. | 376/431 |
| 4,038,138 | 7/1977 | Linning et al. | 376/436 |
| 4,654,193 | 3/1987 | Amano et al. | 376/436 |

Primary Examiner—Donald P. Walsh
Assistant Examiner—Frederick H. Voss
Attorney, Agent, or Firm—Gowling, Strathy & Henderson

[57] ABSTRACT

The invention provides an intertube thermal conductance rate limiting device for a nuclear reactor fuel channel having an inner pressure tube and outer calandria tube. The device comprises a wire screen placed in the annular region between the pressure tube and calandria tube which limits the contact area between the two tubes. By reducing the contact area, the screen limits the thermal conductance rate to the calandria tube. This reduces or eliminates the potential for film boiling or "dryout" of the calandria tube.

6 Claims, 1 Drawing Sheet

INTERTUBE THERMAL CONDUCTANCE RATE LIMITING DEVICE

FIELD OF THE INVENTION

This invention relates to an intertube thermal conductance rate limiting device for a nuclear reactor fuel channel.

BACKGROUND OF THE INVENTION

In a CANDU reactor, the fuel and coolant are separated from the moderator by a horizontal fuel channel. The fuel channel consists of a pressure tube and calandria tube separated by a gas-filled annulus. Within the annulus there are a number of circular springs, known as garter springs, spaced longitudinally for maintaining separation of the pressure tube from the calandria tube.

During a postulated loss of coolant accident with coincident impaired emergency core cooling, pressure tubes become hot and may deform into contact with its surrounding calandria tube. If the pressure tube contacts the calandria tube, the temperature of the calandria tube rises and can lead to film boiling on the outside of the calandria tube. Film boiling or dryout is the condition where water is prevented from contacting the surface of the calandria tube by a film of steam. When this occurs, the ability of the moderator to remove heat from the fuel channel is severly reduced. As a consequence, the temperature of the calandrial tube increases. In extreme cases the integrity of the fuel channel is endangered.

Film boiling could be prevented by lowering the moderator temperature, i.e. increasing moderator subcooling. This would be costly since larger moderator heat exchangers would be required to maintain lower moderator temperatures. Another method of preventing the calandria tube from going into dryout is to reduce the contact conductance between the pressure and calandrial tubes. One approach proposed for limiting thermal conductance rate was to incorporate surface roughness to one of the adjacent tube surfaces, for example, by shot peening or knurling, in order to limit the contact area. Initial findings from this work suggest that shot peening does not generate enough surface roughness to significantly alter the intertube conductance. Furthermore, this approach is not entirely satisfactory as it is difficult to implement and the structural properties of the treated tube are compromised.

SUMMARY OF THE INVENTION

An object of the present invention is to limit the thermal conductance rate between the pressure tube and calandria tube by limiting the contact area between the two tubes.

It has been found that the thermal conductance rate between the pressure tube and calandria tube can be limited by placing a screen having certain dimensional characteristics in the annular space between the pressure tube and calandria tube.

In accordance with the present there is provided an intertube thermal conductance rate limiting device for a nuclear reactor fuel channel having an inner pressure tube and outer calandria tube. The device comprises a screen disposed in an annular region between the pressure tube and calandria tube; said screen comprising wires having a diameter of from 0.05 mm to 1 mm; and said wires being spaced from one another a distance related to the cross-sectional area by $S=KA$, where S is the spacing in mm, A is the cross-sectional area of the wire in $mm^2$, and K is a coefficient having a value between 10 and 300 $mm^{-1}$.

DESCRIPTION OF THE PREFERRED EMBODIMENTS

Figure 2:
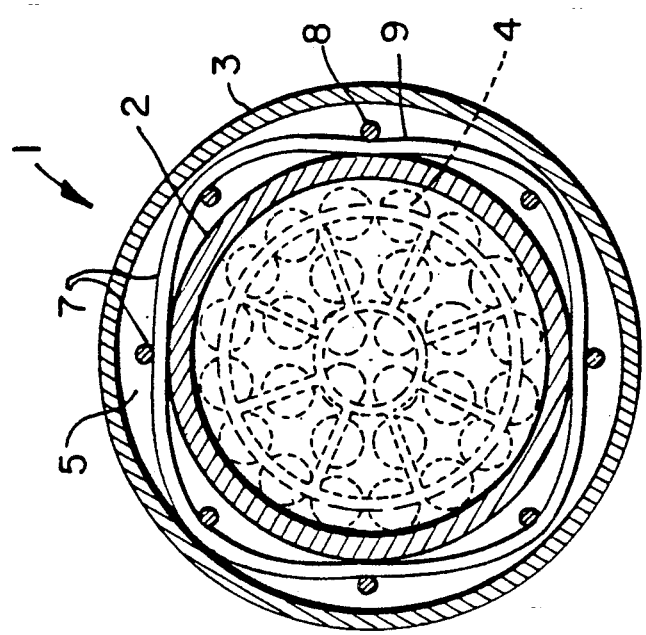
FIG. 2 is a cross-sectional view taken at I—I of FIG. 1.
Figure 1:
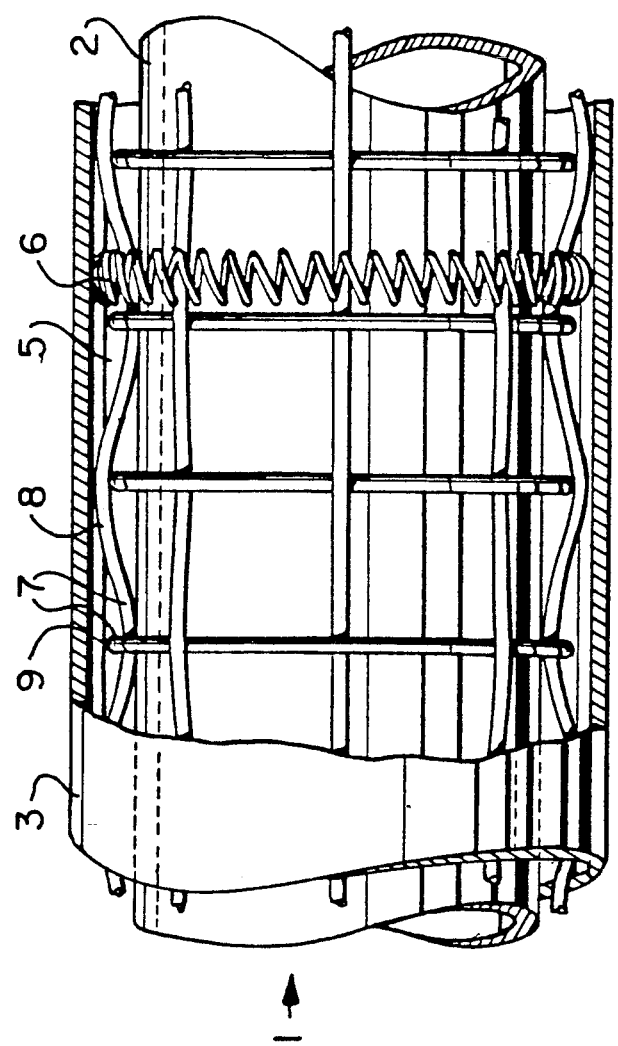
FIG. 1 is a schematic representation of a fuel channel showing the relationship of a pressure tube, calandria tube and intertube screen in accordance with the present invention.

With reference to FIGS. 1 and 2, a fuel channel 1 is shown comprising an inner pressure tube 2 and outer calandria tube 3. The pressure tube 2 contains fuel bundles 4, shown in FIG. 2. At spaced intervals within the annular space 5 are spacers in the form of garter springs 6.

In accordance with the present invention, an intertube screen 7 is shown disposed within the annular space 5, between the pressure tube 2 and calandria tube 3. The screen 7 comprises longitudinal wires 8 and transverse wires 9. The screen 7 limits the contact area between the pressure tube 2 and calandria tube 3 and thereby limits the intertube conductance rate in the event the tubes tend to come together.

The screen wire diameter should be in the range of 0.05 mm to 1 mm. The strength of a wire with a diameter less than 0.05 mm may not be sufficient, particularly over a period of time during which it will become embrittled as the result of thermal and neutron flux. With wire diameters greater than 1 mm, the relatively high mass of the screen would result in a undesirably high neutron absorption. Preferably the wire diameter will be in the range from 0.25 to 0.5 mm.

The wire may have various cross-sectional shapes, such as circular, square, elliptical or rectangular, but circular is preferred as this has minimal surface in direct contact with the tube surfaces when they come into contact, and hence minimal thermal conductance.

The preferred wire spacing is related to wire thickness. In general, as the thickness of the wire decreases, the spacing must be reduced in order to prevent intertube contact and dryout. The required wire thickness versus spacing relation is a function of the surface hardness and the deformation characteristics of the pressure tube. The wire diameter and spacing combination should be sufficient to prevent or limit pressure tube to calandria tube contact. To account for the above, the preferred wire spacing is defined by $S=KA$, where S is the spacing between the wires in mm, A is the cross-sectional area of the wire in $mm^2$, and K is a coefficient, in $mm^{-1}$, relating these two variables. Values of K between 10 and 300 have been shown, in experiments, to significantly reduce the intertube thermal conductance rate. The value of K should be at least 10 to avoid unnecessary mass and, therefore, neutron absorption. The desired values of K could be varied to optimize the desired contact conductance for a particular application. Larger values of K decrease the pressure tube to calandria tube contact conductance for a given wire diameter. The preferred values of K are between 20 and 100.

Preferably the coverage area of the screen will correspond with that of the intertube area.

The screen of the present invention also provides a convenient means of ensuring proper positioning of the garter springs, specifically, by attaching the garter springs to the screen and installing as a unit.

The screen can be fabricated in various forms. For example, the longitudinal and transverse wires can be interwoven or spot welded. In the preferred embodiment the spacing of the longitudinal and transverse wires are approximately equal. Although the screen may be fabricated of a material such as stainless steel, the preferred material for the screen is one having low neutron absorption, such as Zircalloy-4 or other zirconium alloys.

An experiment was conducted to investigate the changes in heat transfer characteristics between a pressure tube and calandria tube with and without a wire screen in the annular space between the pressure tube and calandria tube.

The apparatus comprised a 1580 mm long section of Zr-2.5 wt % Nb pressure tube mounted inside a 1730 mm long Zr-2 calandria tube. The calandria tube was surrounded by heated, non flowing water.

A heater was provided in the form of a 570 mm long, 38 mm diameter graphite rod concentrically located inside the pressure tube. Power to the heater was supplied by a 5000 amp DC power supply.

A 350 mm long section of stainless steel wire screen was placed in the intertube annulus contiguous with the calandria tube, and extending throughout one half of the length of the test section. The screen used was made of 316 stainless steel wire having a diameter of 0.38 mm. One half of the screen had a wire spacing of 1.3 mm and the other half had a spacing of 9.5 mm yielding two separate zones having K values of 11.8 and 86.4, respectively.

An Inconel garter spring was fastened near one end of the screen by wire loops to determine the effectiveness of using a wire screen to insert a garter spring in the proper location. The screen-garter spring assembly was inserted into the calandria tube with the garter spring positioned at the test section centreline.

The test was monitored with video cameras to record any nucleate or film boiling on the calandria tube surface.

The pressure tube was pressurized to 800 kPa with helium. The intertube annulus was purged with $CO_2$ and remained at essentially atmospheric pressure throughout the experiment.

The video records of the test indicated that intertube contact spread over the heated area within 3 seconds. The records clearly indicated film boiling over most of the no-screen area of the calandria tube while the portion with screen was in stable nucleate boiling throughout the test. There was no discernible difference in the boiling patterns between the portion of the test section with the 1.3 mm wire spacing and the portion with 9.5 mm spacing.

There was no detected difference, in terms of pressure tube heatup, for the no-screen and screen portion, before intertube contact.

An estimate of the intertube contact conductance during initial contact was calculated to be greater than 7 kW/($m^2$°C.) for the no-screen side and approximately 0.3 kW/($m^2$°C.) for the side with the wire screen. Contact conductance for the steady state period after intertube contact were estimated at 21 and 0.4 kW/($m^2$°C.) for the no-screen (film boiling) and screen (nucleate boiling) sides, respectively. The decreased contact conductance for the screen half of the test section resulted in a higher steady state pressure-tube temperature after intertube contact. The pressure-tube temperature on the screen half was 600° to 650° C. higher than the half without the wire screen.

The experiment clearly demonstrated the effectiveness of placing an intertube device of the present invention in the annular region between the pressure tube and calandria tube of a fuel channel for reducing the intertube thermal conductance. The reduction in contact conductance significantly reduces the risk of film boiling of the calandria tube.

What is claimed is:

1. An intertube thermal conductance rate limiting device for a nuclear reactor fuel channel having an inner pressure tube and outer calandria tube;

said device comprising a wire screen disposed in an annular region between the pressure tube and calandria tube.

2. The intertube device of claim 1 wherein said screen comprises wires having a diameter between 0.05 mm and 1 mm.

3. The intertube device of claim 2 wherein said wires have a diameter between 0.25 and 0.5 mm.

4. The intertube device of claim 1 wherein the coverage area of the screen corresponds substantially with that of the intertube area.

5. The intertube device of claim 1 wherein the wires of said screen are spaced from one another by a distance given by S=KA, where S is the spacing in mm, A is the cross-sectional area of the wire in $mm^2$, and K is a coefficient having a value between 10 and 300 $mm^{-1}$.

6. The intertube device of claim 5 wherein said value of K is between 20 and 100 $mm^{-1}$.

* * * * *